United States Patent
Aldereguia et al.

(10) Patent No.: US 9,356,903 B2
(45) Date of Patent: May 31, 2016

(54) DYNAMICALLY MANAGING SOCIAL NETWORKING GROUPS

(71) Applicant: LENOVO ENTERPRISE SOLUTIONS (SINGAPORE) PTE. LTD., Singapore (SG)

(72) Inventors: Alfredo Aldereguia, Cary, NC (US); Jeffrey R. Hamilton, Pittsboro, NC (US); Clifton E. Kerr, Durham, NC (US); Grace A. Richter, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 296 days.

(21) Appl. No.: 13/826,970

(22) Filed: Mar. 14, 2013

(65) Prior Publication Data

US 2014/0280539 A1 Sep. 18, 2014

(51) Int. Cl.
*H04L 29/06* (2006.01)
*H04L 12/58* (2006.01)
*G06Q 50/00* (2012.01)

(52) U.S. Cl.
CPC ............... *H04L 51/32* (2013.01); *G06Q 50/01* (2013.01); *H04L 51/20* (2013.01)

(58) Field of Classification Search
None
See application file for complete search history.

(56) References Cited

U.S. PATENT DOCUMENTS

| | | | |
|---|---|---|---|
| 7,801,971 B1 * | 9/2010 | Amidon et al. | G06Q 10/10 |
| 2011/0004501 A1 * | 1/2011 | Pradhan et al. | G06Q 50/01 |
| 2011/0106718 A1 * | 5/2011 | Roberts et al. | G06G 50/01 |
| 2011/0151892 A1 | 6/2011 | Vengroff et al. | |
| 2012/0209781 A1 * | 8/2012 | Michaelis et al. | G06Q 30/02 |
| 2013/0018960 A1 * | 1/2013 | Knysz et al. | G06Q 50/01 |
| 2013/0254374 A1 * | 9/2013 | Bogdany et al. | G06Q 50/01 |
| 2014/0250174 A1 | 9/2014 | Zamer | |

FOREIGN PATENT DOCUMENTS

CN 101271444 A 11/2010

* cited by examiner

*Primary Examiner* — Chris Parry
*Assistant Examiner* — Soe M Hlaing
(74) *Attorney, Agent, or Firm* — Edward J. Lenart; Katherine S. Brown; Kennedy Lenart Spraggins LLP

(57) ABSTRACT

Methods, apparatuses, and computer program products for dynamically managing social networking groups according to embodiments of the present invention are provided. A particular embodiment includes detecting a predetermined number of user devices within a specified physical area; and in response to detecting the predetermined number of user devices within the specified physical area, creating a social networking group corresponding to the specified physical area. Another embodiment includes detecting a predetermined number of user devices exiting a specified physical area, each user device associated with a user belonging to a social networking group corresponding to the specified physical area; and in response to detecting the predetermined number of user devices exiting the specified physical area, destroying the social networking group after a duration following the detection of the predetermined number of users of the social networking group exiting the specified physical area.

11 Claims, 6 Drawing Sheets

DYNAMICALLY MANAGING SOCIAL NETWORKING GROUPS

BACKGROUND OF THE INVENTION

1. Field of the Invention

The field of the invention is data processing, or, more specifically, methods, apparatus, and products for dynamically managing social networking groups.

2. Description of Related Art

A group (often termed as a community, e-group or club) is a feature in many social network services which allows users to create, post, comment to and read from their own interest- and niche-specific forums, often within the realm of virtual communities. Groups, which may allow for open or closed access, invitation and/or joining by other users outside the group, are formed to provide mini-networks within the larger, more diverse social network service. Social networking servers are responsible for storing the content associated with a social network group including pictures, posts, linking information, and tagging information. That is, each social networking group has an impact on resources available to the social networking group. There is a need, therefore, for managing the social networking groups.

SUMMARY OF THE INVENTION

Methods, apparatuses, and computer program products for dynamically managing social networking groups according to embodiments of the present invention are provided. A particular embodiment includes detecting a predetermined number of user devices within a specified physical area; and in response to detecting the predetermined number of user devices within the specified physical area, creating a social networking group corresponding to the specified physical area. Another embodiment includes detecting a predetermined number of user devices exiting a specified physical area, each user device associated with a user belonging to a social networking group corresponding to the specified physical area; and in response to detecting the predetermined number of user devices exiting the specified physical area, destroying the social networking group after a duration following the detection of the predetermined number of users of the social networking group exiting the specified physical area.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
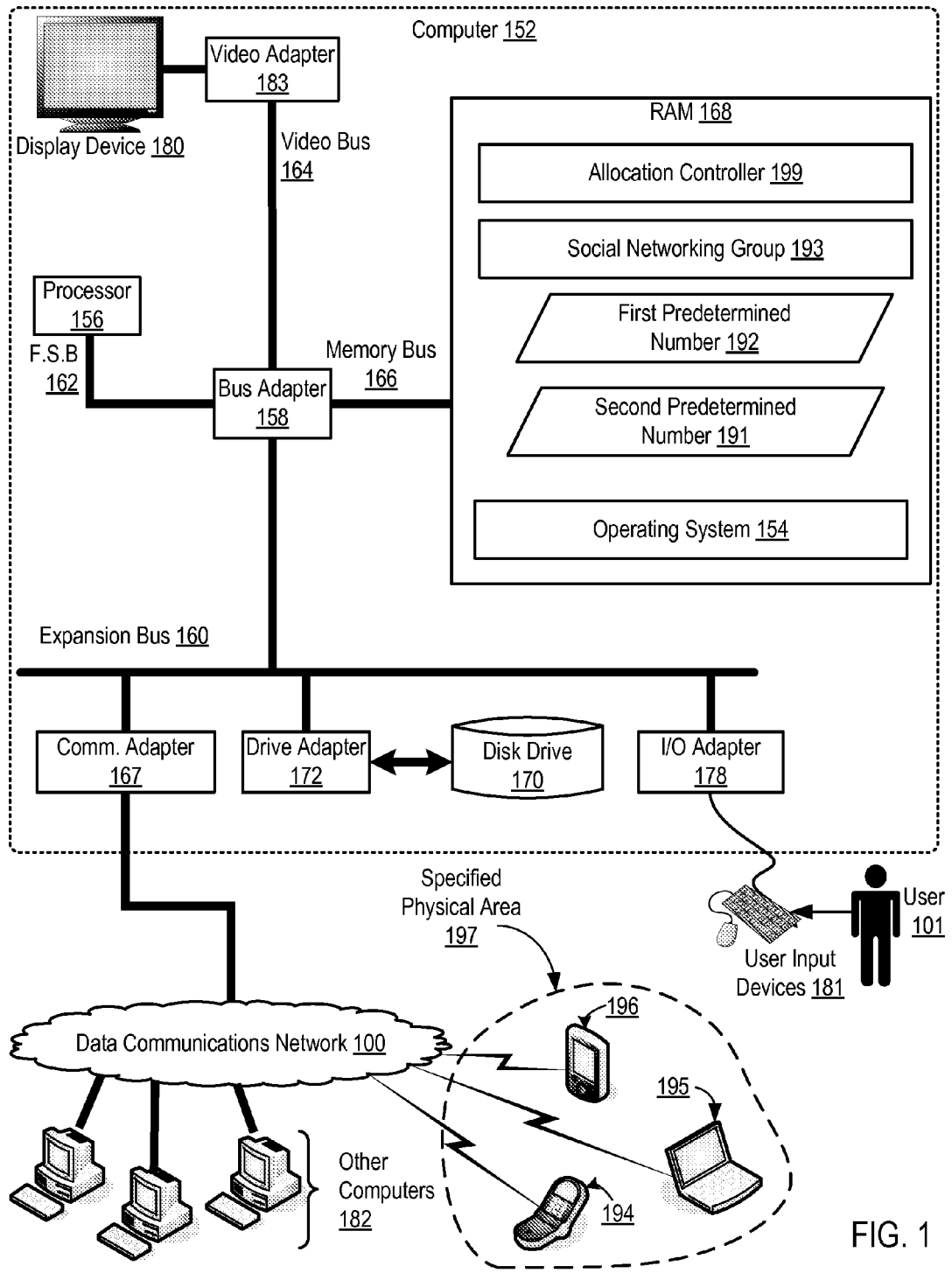
FIG. 1 sets forth a block diagram of automated computing machinery comprising an exemplary computer useful in dynamically managing social networking groups according to embodiments of the present invention.

Exemplary methods, apparatuses, and computer program products for dynamically managing social networking groups in accordance with the present invention are described with reference to the accompanying drawings, beginning with FIG. 1. Dynamically managing social networking groups in accordance with the present invention is generally implemented with computers, that is, with automated computing machinery. FIG. 1 sets forth a block diagram of automated computing machinery comprising an exemplary computer (152) useful in dynamically managing social networking groups according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an allocation controller (199) improved for dynamically managing social networking groups according to embodiments of the present invention. Specifically, the allocation controller (199) includes computer program instructions that when executed cause the allocation controller to carry out the steps of: detecting a first predetermined number (192) of user devices within a specified physical area (197). In response to detecting the first predetermined number (192) of user devices within the specified physical area (197), the allocation controller (199) is configured to create a social networking group (193) corresponding to the specified physical area (197).

In the example of FIG. 1, user devices (196, 195, 194) are within the specified physical area (197). If the predetermined number (192) is three, the allocation controller (199) may create the social networking group (193) to correspond to the collection of the user devices within the specified physical area (197).

In another embodiment, the allocation controller (199) is configured to detect a second predetermined number (191) of user devices exiting the specified physical area (197), each user device associated with a user belonging to the social networking group (193) corresponding to the specified physical area (197). In response to detecting the second predetermined number (191) of user devices exiting the specified physical area (197), the allocation controller (199) is configured to destroy the social networking group (193) after a duration following the detection of the second predetermined number (191) of users of the social networking group (193) exiting the specified physical area (197). In the example of FIG. 1, if two users exit the specified physical area (197) and the second predetermined number (191) is two, the allocation controller (199) may destroy the social networking group (193).

For example, when a sports arena is populated, a hundred thousand user devices may be located within a physical area around the arena. In this example, an allocation controller may determine that the number of user devices exceeds some predetermined number and create a social networking group to correspond to this collection. That is, the allocation controller may create a 'super bowl' social networking group to correspond to this collection. Users of the user devices within the area may be automatically invited to join this group based on the fact that the user devices of the users are or were within the area corresponding to the social networking group. Continuing with this example, when the user devices exit the physical area of the arena, the allocation controller may destroy the social networking group some duration after the user devices exit the arena, such as for example, two hours later.

Also stored in RAM (168) is an operating system (154). Operating systems useful dynamically managing social networking groups according to embodiments of the present invention include UNIX™, Linux™, Microsoft XP™, AIX™, IBM's i5/OS™, and others as will occur to those of skill in the art. The operating system (154), the allocation controller (199), the social networking group (193), the first predetermined number (192), and the second predetermined number (191) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for dynamically managing social networking groups according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182), with a data communications network (100), and with user devices (196, 195, 194). Such data communications may be carried out serially through RS-232 connections, through external buses such as a Universal Serial Bus (USW), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically managing social networking groups according to embodiments of the present invention include modems for wired dial-up communications, Ethernet (IEEE 802.3) adapters for wired data communications network communications, and 802.11 adapters for wireless data communications network communications.

Figure 2:
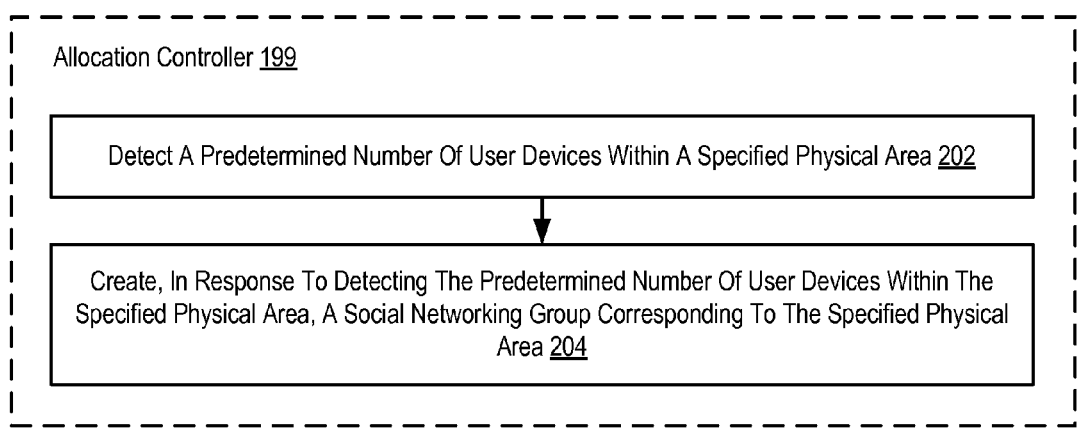
FIG. 2 sets forth a flow chart illustrating an exemplary method for dynamically managing social networking groups according to embodiments of the present.

For further explanation, FIG. 2 sets forth a flow chart illustrating an exemplary method for dynamically managing social networking groups according to embodiments of the present. For ease of explanation, the example components, devices, and data of FIG. 1 are referenced in the description of the method of FIG. 2.

The method of FIG. 2 includes an allocation controller (199) detecting (202) a predetermined number (192) of user devices within a specified physical area (197). Detecting (202) a predetermined number (192) of user devices within a specified physical area (197) may be carried out by retrieving location information associated with user devices. Non-limiting examples of location information include GPS coordinates, wireless network base information, IP addresses, user specified information, cellular network connection information, and many others as will occur for those of skill in the art. Detecting (202) a predetermined number (192) of user devices within a specified physical area (197) may be carried out by comparing the location information associated with the user device with the specified physical area and tracking the number of user devices whose location information corresponds with the specified physical area.

The method of FIG. 2 also includes the allocation controller (199) creating (204), in response to detecting the predetermined number (192) of user devices within the specified physical area (197), a social networking group (193) corresponding to the specified physical area (197). Creating (204), in response to detecting the predetermined number (192) of user devices within the specified physical area (197), a social networking group (193) corresponding to the specified physical area (197) may be carried out by storing information into one or more parameters; linking parameters and users, and enabling permissions and attributes of a social networking group.

Figure 3:
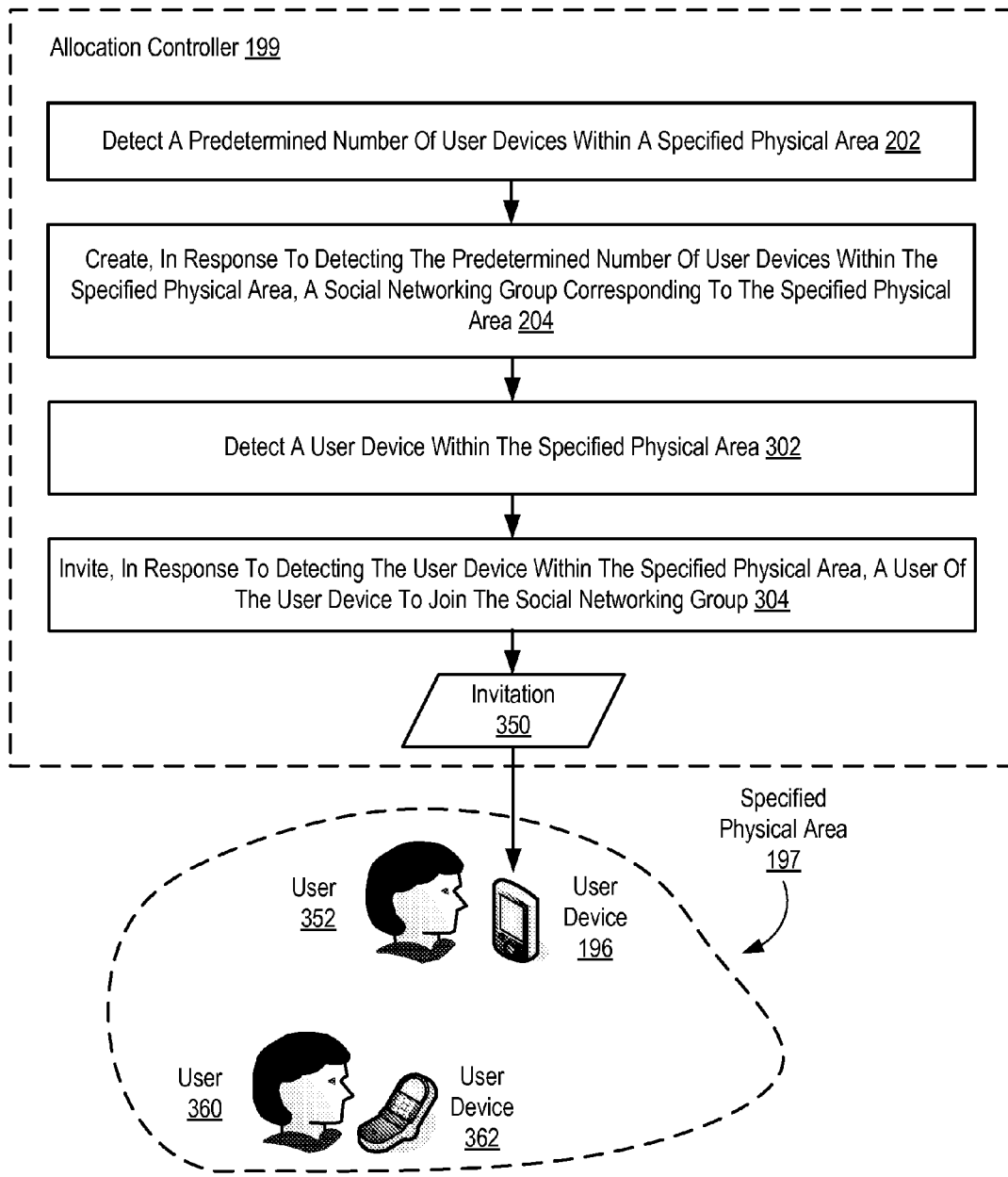
FIG. 3 sets forth a flow chart illustrating a further exemplary method for dynamically managing social networking groups according to embodiments of the present invention.

For further explanation, FIG. 3 sets forth a flow chart illustrating a further exemplary method for dynamically managing social networking groups according to embodiments of the present invention. For ease of explanation, the example components, devices, and data of FIG. 1 are referenced in the description of the method of FIG. 3. The method of FIG. 3 is similar to the method of FIG. 2 in that the method of FIG. 3 also includes: detecting (202) a predetermined number (192) of user devices within a specified physical area (197); and creating (204), in response to detecting the predetermined number (192) of user devices within the specified physical area (197), a social networking group (193) corresponding to the specified physical area (197).

The method of FIG. 3 includes the allocation controller (199) detecting (302) a user device (196) within the specified physical area (197). Detecting (302) a user device (196) within the specified physical area (197) may be carried out by comparing the location information associated with the user device with the specified physical area.

The method of FIG. 3 includes the allocation controller (199) inviting (304), in response to detecting (302) the user device (196) within the specified physical area (197), a user (352) of the user device (196) to join the social networking group (193). Inviting (304) a user (352) of the user device (196) to join the social networking group (193) may be carried out by identifying a user of the user device; querying a social networking service with user device information to identify the user; and transmitting a social networking message to the identified user through the social networking service. A user device may be enter the specified physical area (197) after the creation of the social networking group. For example, user device (362) may enter the specified physical area (197) after creation of the social networking group corresponding to the specified physical area (197). In this example, a user (360) of the user device (196) may be asked to join the social networking group.

Figure 4:
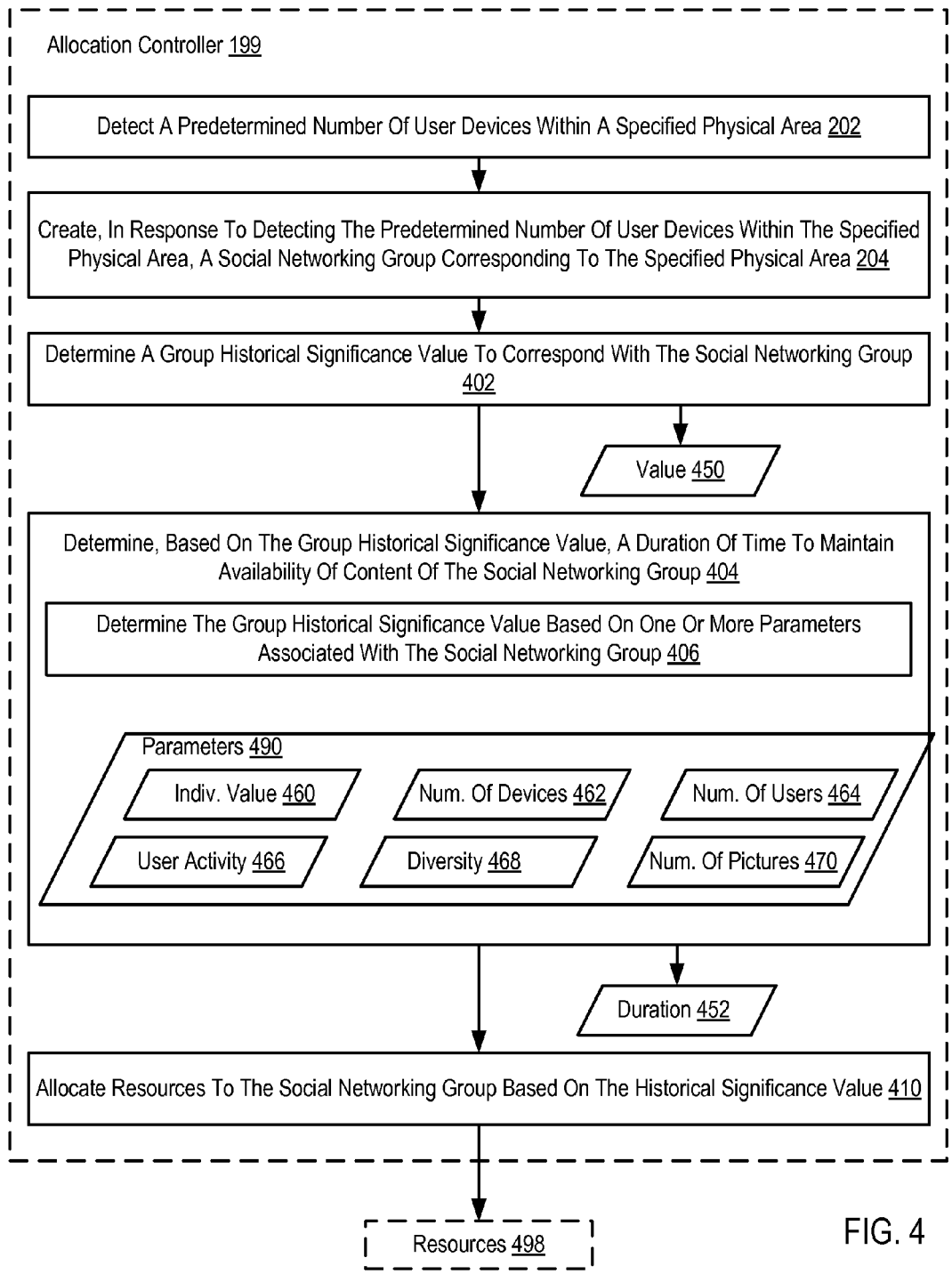
FIG. 4 sets forth a flow chart illustrating a further exemplary method for dynamically managing social networking groups according to embodiments of the present invention.

For further explanation, FIG. 4 sets forth a flow chart illustrating a further exemplary method for dynamically managing social networking groups according to embodiments of the present invention. For ease of explanation, the example components, devices, and data of FIG. 1 are referenced in the description of the method of FIG. 4. The method of FIG. 4 is similar to the method of FIG. 2 in that the method of FIG. 4 also includes: detecting (202) a predetermined number (192) of user devices within a specified physical area (197); and creating (204), in response to detecting the predetermined number (192) of user devices within the specified physical area (197), a social networking group (193) corresponding to the specified physical area (197).

The method of FIG. 4 includes the allocation controller (199) determining (402) a group historical significance value (450) to correspond with the social networking group (193). A group historical significance value is a value indicating a relative importance of a social networking group. Determining (402) a group historical significance value (450) to correspond with the social networking group (193) may be carried out by the allocation controller (199) analyzing one or more parameters, attributes, and user activity to determine the relative importance of this collection of user devices to other collections of user devices.

The method of FIG. 4 also includes the allocation controller (199) determining (404), based on the group historical significance value (450) a duration (452) of time to maintain availability of content of the social networking group (193). Determining (404), based on the group historical significance value (450) a duration (452) of time to maintain availability of content of the social networking group (193) may be carried out by assigning a duration length based on the group historical significance value. For example, for a first group having a group historical significance value of one, the duration may be two days. As another example, for a second group having a group historical significance value of ten, the duration may be two years.

In the example of FIG. 4, determining (404), based on the group historical significance value (450) a duration (452) of time to maintain availability of content of the social networking group (193) optionally includes determining (406) the group historical significance value (450) based one or more parameters (490) associated with the social networking group (193). Determining (406) the group historical significance value (450) based one or more parameters (490) associated with the social networking group (193) may be carried out by examining parameters associated with the social networking group. Examples of parameters include individual historical significance value (460) of a user of the social network group; number (462) of user devices within the specified physical area; number (464) of users associated with the social networking group; amount (466) of user activity within the social networking group; diversity (468) of user activity within the social networking group; and number (470) of pictures posted in the social networking group.

The method of FIG. 4 also includes the allocation controller (199) allocating (410) resources (498) to the social networking group (193) based on the historical significance value (450). Examples of resources include but are not limited to bandwidth, memory, storage, access to services, and many others as will occur to those of skill in the art. Allocating (410) resources (498) to the social networking group (193) based on the historical significance value (450) may be carried out by changing networking bandwidth allocation for activity related to the social networking group; changing access to special services of the social networking services; toggling quality of server performance, and redistributing storage available to the social networking group.

Figure 5:
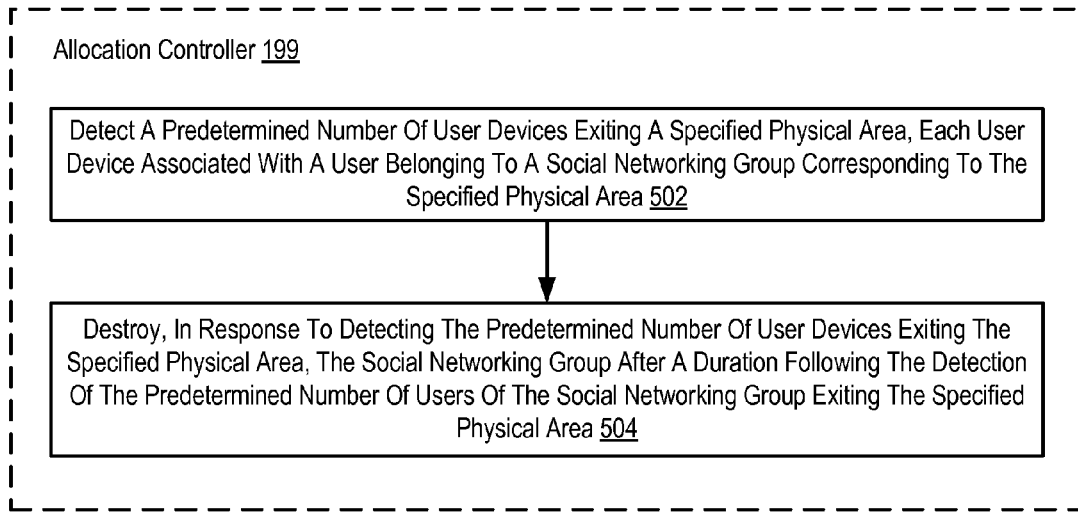
FIG. 5 sets forth a flow chart illustrating a further exemplary method for dynamically managing social networking groups according to embodiments of the present invention.

For further explanation, FIG. 5 sets forth a flow chart illustrating a further exemplary method for dynamically managing social networking groups according to embodiments of the present invention. For ease of explanation, the example components, devices, and data of FIG. 1 are referenced in the description of the method of FIG. 5.

The method of FIG. 5 includes the allocation controller (199) detecting (502) a predetermined number (191) of user devices exiting a specified physical area (197). Each user device is associated with a user belonging to a social networking group (193) corresponding to the specified physical area (197). Detecting (502) a predetermined number (191) of user devices exiting a specified physical area (197) may be carried out by retrieving location information associated with user devices. Non-limiting examples of location information include GPS coordinates, wireless network base information, IP addresses, user specified information, cellular network connection information, and many others as will occur for those of skill in the art. Detecting (502) a predetermined number (191) of user devices exiting a specified physical area (197) may be carried out by comparing the location information associated with the user device with the specified physical area and tracking the number of user devices whose location information corresponds with the specified physical area.

The method of FIG. 5 also includes the allocation controller (199) destroying (504), in response to detecting (502) the predetermined number (191) of user devices exiting the specified physical area (197), the social networking group (193) after a duration following the detection (502) of the predetermined number (191) of users of the social networking group (193) exiting the specified physical area (197). Destroying (504), the social networking group (193) after a duration following the detection (502) of the predetermined number (191) of users of the social networking group (193) exiting the specified physical area (197) may be carried out by deleting content related to the social networking group, such as pictures, posts, tags, and many others as will occur to those of skill in the art.

Figure 6:
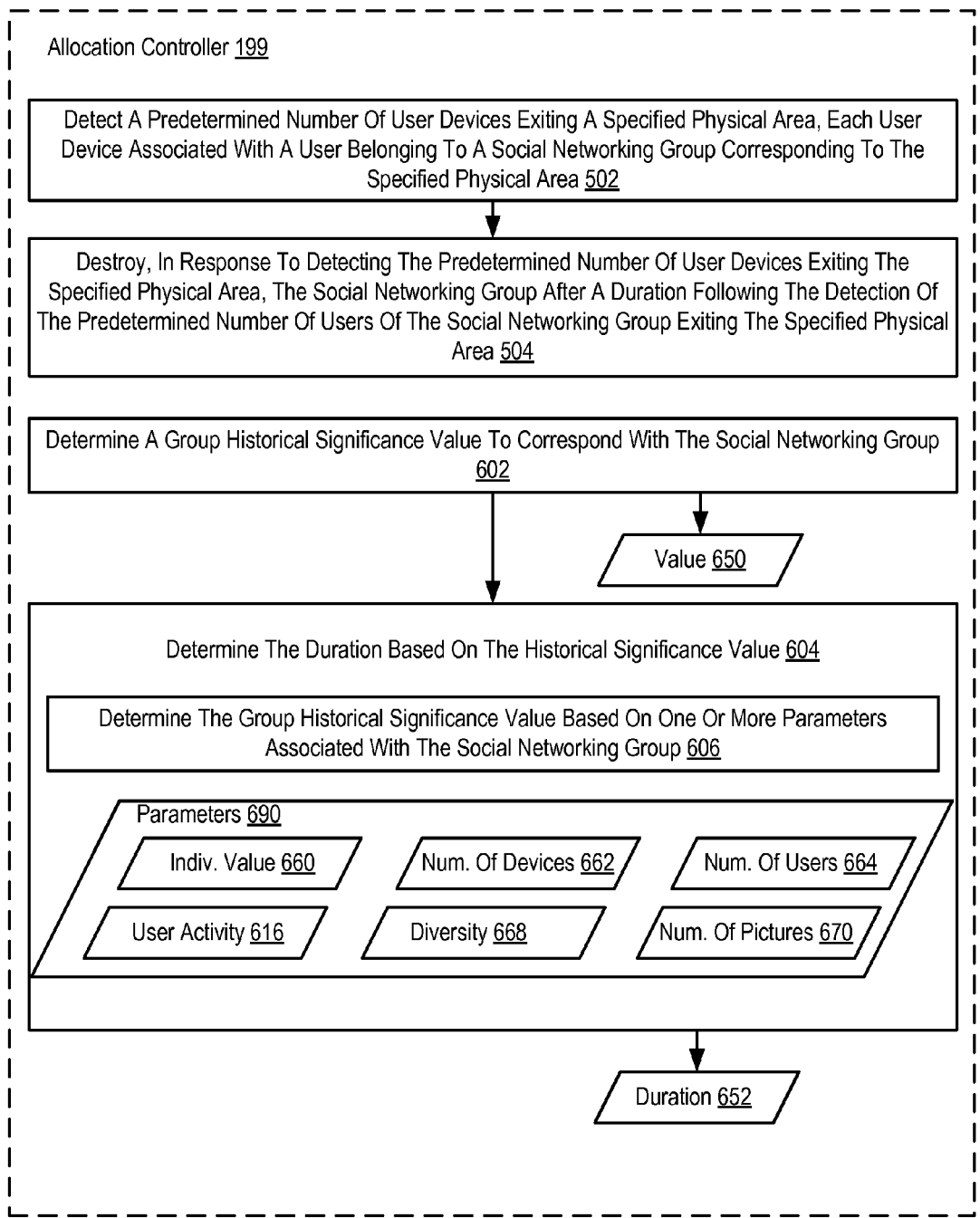
FIG. 6 sets forth a flow chart illustrating a further exemplary method for dynamically managing social networking groups according to embodiments of the present invention.

For further explanation, FIG. 6 sets forth a flow chart illustrating a further exemplary method for dynamically managing social networking groups according to embodiments of the present invention. For ease of explanation, the example components, devices, and data of FIG. 1 are referenced in the description of the method of FIG. 6. The method of FIG. 6 is similar to the method of FIG. 5 in that the method of FIG. 6 also includes detecting (502) a predetermined number (191) of user devices exiting a specified physical area (197); and destroying (504), in response to detecting (502) the predetermined number (191) of user devices exiting the specified physical area (197), the social networking group (193) after a duration following the detection (502) of the predetermined number (191) of users of the social networking group (193) exiting the specified physical area (197).

The method of FIG. 6 includes the allocation controller (199) determining (602) a group historical significance value (650) to correspond with the social networking group (193). A group historical significance value is a value indicating a relative importance of a social networking group. Determining (602) a group historical significance value (650) to correspond with the social networking group (193) may be carried out by the allocation controller (199) analyzing one or more parameters, attributes, and user activity to determine the relative importance of this collection of user devices to other collections of user devices.

The method of FIG. 6 also includes the allocation controller (199) determining (604) the duration based on the historical significance value (650). Determining (604) the duration based on the historical significance value (650) may be carried out by assigning a duration length based on the group historical significance value. For example, for a first group having a group historical significance value of one, the duration may be two days. As another example, for a second group having a group historical significance value of ten, the duration may be two years.

In the example of FIG. 6, determining (604) the duration based on the historical significance value (650) optionally includes determining (606) the group historical significance value (650) based one or more parameters associated with the social networking group (193). Determining (606) the group historical significance value (650) based one or more parameters associated with the social networking group (193) may be carried out by examining parameters associated with the social networking group. Examples of parameters includes individual historical significance value (660) of a user of the social network group; number (662) of user devices within the specified physical area; number (664) of users associated with the social networking group; amount (616) of user activity within the social networking group; diversity (668) of user activity within the social networking group; and number (670) of pictures posted in the social networking group.

Exemplary embodiments of the present invention are described largely in the context of a fully functional computer system for dynamically managing social networking groups. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computing device, a computer processor, and a computer memory operatively coupled to the computer processor, the computer memory having disposed within it computer program instructions that, when executed by the computer processor, cause the apparatus to carry out the steps of:
   detecting a first predetermined number of user devices within a specified physical area;
   in response to detecting the first predetermined number of user devices within the specified physical area, creating a social networking group corresponding to the specified physical area;
   determining, in dependence upon an amount of user activity within the social networking group, a group historical significance value to correspond with the social networking group;
   allocating computing resources to the social networking group based on the historical significance value determined in dependence upon the amount of user activity within the social networking group;
   determining, based on the group historical significance value, a duration of time to maintain availability of content of the social networking group;
   in response to detecting a second predetermined number of user devices exiting the specified physical area, maintaining the availability of the content of the social network group for the duration of time; and
   destroying the social networking group after the expiration of the duration of time following the detection of the second predetermined number of users of the social networking group exiting the specified physical area.

2. The apparatus of claim 1 further comprising computer program instructions that, when executed by the computer processor, cause the apparatus to carry out the steps of:
   detecting a user device within the specified physical area; and
   in response to detecting the user device within the specified physical area, inviting a user of the user device to join the social networking group.

3. A computer program product including a non-transitory computer readable medium, the computer program product comprising computer program instructions that, when executed, cause a computer to carry out the steps of:
   detecting a first predetermined number of user devices within a specified physical area;
   in response to detecting the predetermined number of user devices within the specified physical area, creating a social networking group corresponding to the specified physical area; and
   determining, in dependence upon an amount of user activity within the social networking group, a group historical significance value to correspond with the social networking group;
   allocating computing resources to the social networking group based on the historical significance value determined in dependence upon the amount of user activity within the social networking group;
   determining, based on the group historical significance value, a duration of time to maintain availability of content of the social networking group;
   in response to detecting a second predetermined number of user devices exiting the specified physical area, maintaining the availability of the content of the social network group for the duration of time; and
   destroying the social networking group after the expiration of the duration of time following the detection of the second predetermined number of users of the social networking group exiting the specified physical area.

4. The computer program product of claim 3 wherein the computer readable medium comprises a storage medium.

5. A method comprising:
   detecting, by a computing device, a first predetermined number of user devices within a specified physical area;
   in response to detecting, by the computing device, the first predetermined number of user devices within the specified physical area, creating, by the computing device, a social networking group corresponding to the specified physical area;
   determining, by the computing device, in dependence upon an amount of user activity within the social networking group, a group historical significance value to correspond with the social networking group;
   allocating, by the computing device, computing resources to the social networking group based on the historical significance value determined in dependence upon the amount of user activity within the social networking group;
   determining, by the computing device, based on the group historical significance value, a duration of time to maintain availability of content of the social networking group;

in response to detecting, by the computing device, a second predetermined number of user devices exiting the specified physical area, maintaining, by the computing device, the availability of the content of the social network group for the duration of time; and destroying, by the computing device, the social networking group after the expiration of the duration of time following the detection of the second predetermined number of users of the social networking group exiting the specified physical area.

6. The method of claim 5 further comprising:

detecting a user device within the specified physical area; and in response to detecting the user device within the specified physical area, inviting a user of the user device to join the social networking group.

7. The method of claim 5 wherein determining the group historical significance value to correspond with the social networking group includes determining the group historical significance value based one or more parameters associated with the social networking group.

8. The method of claim 7 wherein the one or more parameters includes at least one of: individual historical significance value of a user of the social network group; number of user devices within the specified physical area; number of users associated with the social networking group; diversity of user activity within the social networking group; and number of pictures posted in the social networking group.

9. A method of dynamically managing social networking groups, the method comprising:

determining, by a computing device, in dependence upon an amount of user activity within a social networking group, a group historical significance value to correspond with the social networking group;

allocating, by the computing device, computing resources to the social networking group based on the historical significance value determined in dependence upon the amount of user activity within the social networking group;

determining, by the computing device, a duration of time based on the group historical significance value;

detecting, by the computing device, a predetermined number of user devices exiting a specified physical area, each user device associated with a user belonging to a social networking group corresponding to the specified physical area; and in response to detecting, by the computing device, the predetermined number of user devices exiting the specified physical area, destroying, by the computing device, the social networking group after the duration of time following the detection of the predetermined number of users of the social networking group exiting the specified physical area.

10. The method of claim 9 wherein determining the group historical significance value to correspond with the social networking group includes determining the group historical significance value based one or more parameters associated with the social networking group.

11. The method of claim 10 wherein the one or more parameters includes at least one of: individual historical significance value of a user of the social network group; number of user devices within the specified physical area; number of users associated with the social networking group; amount of user activity within the social networking group; diversity of user activity within the social networking group; and number of pictures posted in the social networking group.

* * * * *